United States Patent [19]
Byszewski et al.

[11] Patent Number: 5,194,130
[45] Date of Patent: Mar. 16, 1993

[54] METHOD TO PRODUCE SODIUM CITRATE USING ELECTRODIALYSIS

[75] Inventors: Carolyn Byszewski, Whippany; Yu-Chih Chiao, Bridgewater, both of N.J.

[73] Assignee: Allied-Signal Inc., Morristown, N.J.

[21] Appl. No.: 631,551

[22] Filed: Dec. 21, 1990

[51] Int. Cl.$^5$ .................. B01D 61/44; B01D 63/00
[52] U.S. Cl. .................. 204/182.4; 204/182.5; 204/301
[58] Field of Search .................. 204/301, 182.3, 182.4, 204/182.5

[56] References Cited

U.S. PATENT DOCUMENTS

| | | | |
|---|---|---|---|
| 2,829,095 | 4/1958 | Oda et al. | 204/98 |
| 3,165,415 | 1/1965 | Kilburn et al. | 204/182.4 |
| 4,024,043 | 5/1977 | Dege et al. | 204/296 |
| 4,082,835 | 4/1978 | Chlanda et al. | 423/242 |
| 4,116,889 | 9/1978 | Chlanda et al. | 521/27 |
| 4,391,680 | 7/1983 | Mani et al. | 204/98 |
| 4,536,269 | 8/1985 | Chlanda et al. | 204/182.4 |
| 4,608,141 | 8/1986 | Chlanda | 204/182.5 |
| 4,740,281 | 4/1988 | Chlanda et al. | 204/151 |
| 4,766,161 | 8/1988 | Chlanda et al. | 521/27 |
| 4,781,809 | 11/1988 | Falcone, Jr. | 204/182.4 |
| 4,882,277 | 11/1989 | Czytko et al. | 204/182.4 |

FOREIGN PATENT DOCUMENTS

1078329 5/1980 Canada.
0230021 7/1987 European Pat. Off..

OTHER PUBLICATIONS

Deacidification of Citric and Solutions by Electrodialysis, H. Voss, Journal of Membrane Science, 27 (1986) pp. 165–171.
Kirk–Othmer Encyclopedia of Chemical Technology 2d Ed; vol. 5, pp. 524–541 (1964).

*Primary Examiner*—John Niebling
*Assistant Examiner*—Arun S. Phasge
*Attorney, Agent, or Firm*—Karen A. Harding; Jay P. Friedenson

[57] ABSTRACT

The present invention relates to a method and an apparatus of electrodialytically treating an acid such as citric acid to produce a desired salt of the anion of the acid, such as sodium citrate. A cation can be introduced into a solution via a cheap donor salt solution such as NaCl or KCl, without significantly altering or degrading the purity of the final product. The apparatus comprises a three-compartment cell, which comprises at least two adjacent anion selective membranes to accomplish a cation substitution reaction exploiting the differential selectivities of the adjacent anion membranes employed.

14 Claims, 2 Drawing Sheets

METHOD TO PRODUCE SODIUM CITRATE USING ELECTRODIALYSIS

BACKGROUND OF THE INVENTION

1. Field of the Invention

This invention relates to an improved apparatus and method useful to produce sodium citrate. More particularly; the invention is an apparatus and related method to electrodialytically treat an impure aqueous solution of citric acid to produce substantially pure sodium citrate.

2. Description of Related Art

A review of citric acid and its production is presented in Kirk-Othmer, Encyclopedia of Chemical Technology, Second Edition, Volume 5, pages 524 to 541, John Wiley and Sons, Inc. (1964). Citric acid also known as β-hydroxy- tricarboxylic acid or 2-hydroxy-1,2,3-propane tricarboxylic acid.

Citric acid is produced by mycological fermentation of carbohydrates. The fermentation process yields citric acid and the balance of the fermented solution which includes a variety of impurities. In order to separate the citric acid from the impurities the fermentation solutions are filtrated to remove the mycelia, followed by either precipitation of the calcium salt or direct crystallization on concentration of the filtrate. When citric acid is recovered by calcium salt precipitation, the quantity of citric acid in the filtrate after mycelium removal is determined and the amount of calcium hydroxide needed to neutralize the solution is calculated.

The calcium citrate is transferred to an acidification tank. The citrate is suspended in the wash water, from a previous calcium sulfate filtration, and concentrated sulfuric acid is added simultaneously to give a slight excess of sulfuric acid at the end of the batch. The calcium sulfate is filtered off and washed using a conventional industrial filter.

The dilute citric acid solution is purified by de-colorization and de-mineralization. The de-colorization step involves treating of the solution with activated carbon, followed by a polishing filtration. The sparkling clear solution is then passed successively through a cation exchange resin bed and an anion exchange bed.

The de-mineralized citric acid is evaporated in a circulating vacuum pan granulator or in a circulating evaporator-crystallizer. Where sodium citrate is the desired product the citric acid is reacted with sodium hydroxide to yield sodium citrate.

The fermentation products yield by-products which have had little commercial value. They consist of a filter cake obtained from purification of syrup used as raw material, the mycelium filter cake, the filtrate from calcium citrate filtration which contains residual sugars, and hydrated calcium sulfate. The calcium sulfate is of a quality suitable to use as an excipient in pharmacology. Ergosterol has been obtained commercially from the mycelium of the surface fermentation process.

Sodium salts of citric acid are commercially useful. Two sodium citrate hydrates include $Na_3C_6H_5O_7 \cdot 2H_2O$ and $Na_3C_6H_5O_7 \cdot 5\frac{1}{2}H_2O$. Sodium citrate is used in foods as a buffering agent in conjunction with citric acid and for accurate control of pH in the manufacture of jams, jellies and preserves. It is also used as a stabilizer and emulsifier in processed cheese Sodium citrate additionally has pharmaceutical applications.

Electrodialysis uses direct current as a means to cause the movement of ions in solutions. Electrodialysis processes are well known in the art and are typically carried out in a stack arrangement comprising a plurality of flat sheet membranes. The stack consists of electrodes (anode and cathode) at either end and a series of membranes and gaskets which are open in the middle to form a multiplicity of compartments separated by the membranes. Usually, a separate solution is supplied to the compartments containing the electrodes. Special membranes may be placed next to the electrode containing compartments in order to prevent mixing of the process streams with the electrode streams. The majority of the stack between the electrode compartments comprises a repeating series of units of different membranes with solution compartments between adjacent membranes. This repeating unit is called the unit cell, or simply, a cell. Solution is typically supplied to the compartments by internal manifolds formed as part of the gaskets or by a combination of internal and external manifolds. The stacks can include more than one type of unit cell. Streams may be fed from one stack to another in order to optimize process efficiency. Usually the change in composition of a stream after one pass through the stack is relatively small and the solutions can be recycled by being pumped to and from recycle tanks. Addition of fresh solution to and withdrawal of product from the recycle loop can be made either continuously or periodically in order to control the concentration of products in a desired range.

Treatment of aqueous salt streams by electrodialysis to form acid and/or base from the salt is known. The aqueous salt stream is fed to an electrodialytic water splitting apparatus which comprises an electrodialysis stack and a means for electrodialytically splitting water. A useful apparatus is disclosed in U.S. Pat. No. 4,740,281. A useful means to split water to hydrogen ions ($H^+$) and hydroxyl ions ($OH^-$) is a bipolar membrane such as disclosed in U.S. Pat. No. 4,766,161. The bipolar membrane is comprised of anion selective and cation selective layers of ion exchange material. In order for the membrane to function as a water splitter, the layers must be arranged so that the anion layer of each membrane faces the anode. A direct current passed through the membrane in this configuration will cause water splitting with hydroxyl ions being produced on the anode side and a corresponding number of hydrogen ions being produced on the cathode side of the membrane.

Electrodialytic water-splitting in a two-compartment cell has been disclosed, for example, in U.S. Pat. No. 4,391,680 relating to the generation of strongly acidified sodium chloride and aqueous sodium hydroxide from aqueous sodium chloride. U.S. Pat. No. 4,608,141 discloses a multi-chamber two-compartment electrodialytic water splitter and a method for using the same for basification of aqueous soluble salts. U.S. Pat. No. 4,536,269 disclose a multi-chamber two-compartment electrodialytic water splitter and a method for using the same for acidification of aqueous soluble salts. Three-compartment electrodialytic water splitters are disclosed to be comprised of alternating bipolar, anion and cation exchange membranes thereby forming alternating acid, salt and base compartments (B). U.S. Ser. No. 135,562 discloses three-compartment electrodialytic water splitters. U.S. Pat. No. 4,740,281 discloses the recovery of acids from materials comprising acid and salt using an electrodialysis apparatus to concentrate the acid followed by the use of an electrodialytic three-compartment water splitter to separate the acid from the salt.

SUMMARY OF THE INVENTION

The present invention relates to a method and an apparatus of electrodialytically treating an acid to produce a desired salt of the anion of the acid. A cation can be introduced into a solution via a cheap donor salt solution such as NaCl or KCl, without significantly altering or degrading the purity of the final product. The apparatus comprises a three-compartment cell, which comprises at least two adjacent anion selective membranes to accomplish a cation substitution reaction exploiting the differential selectives of the adjacent anion membranes employed.

In a practical application, the present invention relates to an improved method to produce sodium citrate of the type wherein carbohydrates are fermentated to produce an aqueous solution containing citric acid. The improvement comprises electrodialytically converting the aqueous citric acid solution to sodium citrate solution. The aqueous citric acid solution is simultaneously converted to sodium citrate which is purified and more concentrated.

The electrodialysis apparatus comprises at least one unit cell. In a preferred embodiment used to convert acid to salt, the unit cell comprises at least one water splitter means, preferably a bipolar membrane, to convert water to hydrogen ion (H+) and hydroxyl ion (OH−). There is a first anion selective membrane adjacent to the water splitter means. The first anion selective membrane is selective to a first anion having a negative valence of at least −1 and preferably from −1 to −3, such as citrate anion. There is a base compartment (B) between the first anion selective membrane and the water splitting means located to receive the hydroxyl ion from the water splitter means. There is a second anion selective membrane adjacent to the first anion selective membrane. The second anion selective membrane is selective to a second anion which is different than the first anion preferably having a negative valence of less than the valence to which the first anion membrane is selective. A typical and preferred second anion, when the first anion is a citrate anion, is a chloride anion. The second anion selective membrane is nonselective or substantially less selective, to the first anion, i.e., citrate anion. There is a salt compartment (S) between the first and second anion selective membranes and an acid compartment (A) adjacent to the salt compartment (S). The salt compartment (S) is fed with the cation of donor solution, i.e., NaCl, from an outside source. It is in this salt compartment (S) that the desired cation (Na+) is substituted and retained. The acid compartment (A) is adjacent to and disposed to receive hydrogen ion (H+) from the water splitting means serially aligned with the second anion membrane of the unit cell. The first anion selective membrane is a "loose" anion membrane while the second anion selective membrane is a "tight" anion selective membrane relative to the first anion selective membrane.

The present invention includes a method of operation of the above recited apparatus to generate salt comprising the donor cation and the anion from an aqueous acid solution. In accordance with the method an aqueous solution is fed to the base compartment (B), an aqueous salt stream to the salt compartment (S), and an aqueous stream optionally comprising acid to the acid compartment (A). An electrical potential is created across the cell to cause the introduction of hydroxyl ion into the base compartment (B) and hydrogen ion into the acid compartment (A) from the water splitting means. Acid anions are transported from the base compartment (B) to the salt compartment (S). Salt anions are transported from the salt compartment (S) to the acid compartment (A). Acid depleted aqueous stream is removed from the base compartment (B). Similarly, the salt of an acid anion and a donor cation is removed from the salt compartment (S), and acid of the salt anion is removed from the acid compartment (A).

The method can generate substantially pure, more concentrated sodium citrate from an aqueous citric acid broth solution containing sugars, mycelium, and suspended solids using the above recited electrodialysis apparatus. An aqueous salt solution comprising citric acid (a first anion containing acid) from the fermentation system, downstream of the microfilter, is fed to the base compartment (B). An aqueous stream comprising sodium chloride or other suitable salt is fed into the salt compartment (S). An aqueous stream optionally comprising acid is fed to the acid compartment (A). A sufficient electrical potential is applied across the unit cells to cause the introduction of hydroxyl into the base compartment (B) and hydrogen ion into the acid compartment (A) from the means for splitting water. Citrate anion is transported from the base compartment (B) across the first anion selective means to the salt compartment (S) and chloride anion is transported across the second anion selective means from the salt compartment (S) to the acid compartment (A). Depleted citric acid aqueous stream is recovered from the base compartment (B). Substantially pure sodium citrate is recovered from the salt compartment (S) and substantially pure hydrochloric acid is recovered from the acid compartment (A).

The present invention thereby results in an improved process for obtaining purified sodium citrate directly from a substantially contaminated raw citric acid broth. It eliminates many intermediate steps for treating the citric acid broth to separate citric acid and convert it to sodium citrate as disclosed in the prior art. For example, in the prior art, sodium citrate was formed by contacting purified citric acid with sodium hydroxide. In accordance with the present invention the sodium is supplied by a safe, cheap, easy to handle, sodium chloride salt.

Additionally, the present invention is an improved method and apparatus for treating any acid stream to convert it into the salt of the anion by treating it with another salt, thereby avoiding the formation of salt by the direct chemical contacting of the acid and the base.

BRIEF DESCRIPTION OF THE DRAWINGS

Corresponding elements in FIGS. 1 and 2 have the same reference characters, unless indicated otherwise. In the Figures, ion transport is indicated by a solid arrow.

DESCRIPTION OF THE PREFERRED EMBODIMENTS

Figure 1:
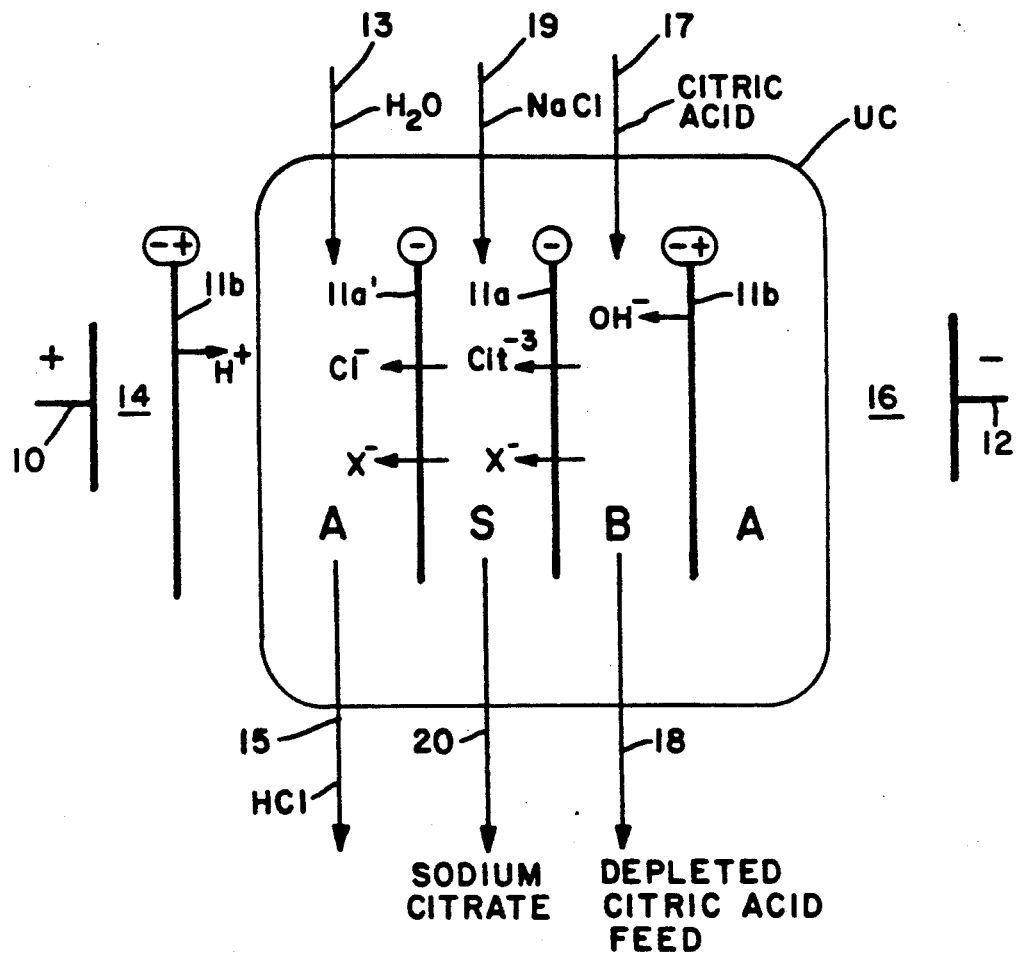
FIG. 1 is a schematic drawing of an electrodialysis apparatus of the present invention.

The present invention will be understood by those skilled in the art by reference to the accompanying Figures. FIG. 1 is a schematic drawing of an electrodialysis apparatus of the present invention. The electrodialytic water splitter shown in FIG. 1 is useful to convert an aqueous solution of citric acid to sodium citrate.

The water splitter comprises, in series, an anode 10 (e.g., a platinum or nickel anode); an anolyte compartment 14; repeating in series of acid (A); salt (S); and base (B) compartments; a catholyte compartment 16; and a cathode 12 (e.g., a platinum cathode). The acid, salt and base compartments (B) of the water splitter illustrated in FIG. 1 are defined by a plurality of serially arranged membranes as follows: a bipolar membrane 11$b$, a first anion selective membrane 11$a$, and a second anion selective membrane 11$a'$. Although FIG. 1 shows four serially arranged compartments, the electrodialytic water splitter is defined by a plurality of unit cells, each unit cell (UC) comprising a bipolar membrane (or equivalent structure capable of splitting water into hydrogen and hydroxyl ions), a first anion membrane, and a second anion membrane. The first anion selective membrane 11$a$ adjacent to the water splitter means 11$b$ is selective to citrate anions. The first anion selective membrane 11$a$ is also known as a loose anion membrane in that it has low resistance to anion permeation. There is a base compartment (B) between the first anion selective membrane 11$a$ and water splitter means 11$b$ located to receive $OH^-$ from the water splitter means.

The second anion selective membrane 11$a'$ is adjacent to the first anion selective membrane 11$a$. The second anion selective membrane 11$a'$, also called a tight membrane, is selective to chloride anions and nonselective to citrate anions. There is a salt compartment (S) between the first and second anion selective membranes and an acid compartment (A) on the opposite side of the second anion membrane 11$a'$ from the salt compartment (S). The acid compartment (A) is adjacent to and disposed to receive $H^+$ from a water splitting means which is serially aligned with the second anion membrane 11$a'$ of the unit cell.

The anolyte and catholyte compartments typically contain a base, salt, or acid solution (e.g., NaOH, KOH, $Na_2SO_4$, or $H_2SO_4$), the acid (A) and base (B) compartments initially contain a liquid comprising water, added via lines 13 and 17, respectively. Salt (S) compartment initially contains a salt solution, comprising a salt MX of a cation ($M^+$) and an anion, preferably NaCl added via line 19.

An electrical potential is applied between the electrodes 10 and 12 causing the citrate anions to pass through first anion membrane 11$a$ from the base compartment (B) to the salt compartment (S) leaving behind the sugars, carbohydrates, mycelium and other contaminants such as $Ca^{++}$, $Mg^{++}$ ions. Anions such as $SO_4^=$ and $Cl^-$ initially contained in the broth will also be transported. The chloride anion, (as well as other anion contaminants present from the broth $SO_4^=$, pass through the second anion membrane 11$a'$ to the acid compartment (A). The citrate anions and sodium cations remain in the salt compartment (S) as an aqueous sodium citrate solution. Hydrogen ions ($H^+$) are supplied to the acid compartment (A) via the function of the bipolar membrane 11$b'$. The combination of the hydrogen ions with the chloride anions yields hydrochloric acid in acid compartment (A) believed to be suitable for ion exchange regeneration. Hydroxyl ions ($OH^-$) generated at the bipolar membrane 11$b$ pass into the base compartment (B).

Typically, the fermentation broth containing the citric acid also contains a variety of other anions and cations. These cations ($Mg^{++}$, $Ca^{++}$) substantially remain in the base compartment (B) and are removed as part of the depleted base solution. Total neutrality results from the hydroxyl ions formed at the bipolar membrane.

The various anions other than citrate anions are represented by the designation ($X^-$) which refers not only to monovalent anions but also to divalent anions, such as sulfates, and mixtures thereof with the requirement that they can pass through the second tighter anion selective membrane leaving the citrate anions behind in the salt compartment (S). Because the salt compartment (S) is bounded by anion membranes the sodium cation remains there resulting in the formation of sodium citrate of increased concentration.

Useful bipolar membranes comprise a cation layer ($+$) and an anion layer ($-$). The cation layer permits the cations to pass through and the anion layer permits anions to pass through. The cation layer is a barrier to anions and the anion layer is a barrier to cations. In the stack of the present invention the anions layers face the anode and the cation layers face the cathode. Useful cation membranes permit cations to pass through and are a barrier to anions, and similarly useful anion membranes permit anions to pass through and are a barrier to cations.

Examples of bipolar membranes which are particularly useful include those described in U.S. Pat. No. 2,829,095 to Oda, et al. (which has reference to water splitting generally), in U.S. Pat. No. 4,024,043 (which describes a single film bipolar membrane), and in U.S. Pat. No. 4,116,889 (which describes a cast bipolar membrane and is most preferred) and U.S. Pat. No. 4,082,835. However, any means capable of splitting water into hydrogen and hydroxyl ions may be used; for example, spaced apart anion and cation membranes having water disposed therebetween.

Useful anion membranes include strongly, mildly, or weakly basic anion membranes. Commercially available anion membranes include membranes from Ionics, Inc., Watertown, Mass. (sold as Ionics 204-UZL-386 anion membrane), or from Asahi Glass Co. (sold under the trade name Selemion® AMV AAV, ASV anion permselective membranes), or from RAI Corporation, Hauppauge, Long Island, N.Y. or Asahi Glass or Tokuyama Soda (ACM).

For the purposes of the present invention the first anion selective membrane can be considered to be a "loose" membrane relative to the second anion selective membrane which is considered a "tight" membrane. The loose membrane permits the transport or migration across it of a greater variety of anions than the tight membrane. Preferably, the loose membranes permits the transport of anions having a valence of from $-1$ to $-3$, while the tight anion membrane permits transport of anions having a valence of only $-1$ across it. All of the anions in the base compartment (B) can transport again across the loose membrane 11$a$ while only anions having a valence of $-1$ can transport from the salt compartment (S) across tight membrane 11$a'$ into the acid compartment (A). The electrodialytic cell can be used to selectively form a salt of a higher valence anion in the salt compartment (S) and a lower valence anion in the acid compartment (A). This is particularly useful when trying to make sodium citrate from citric acid. This apparatus enables the donor cation sodium to be supplied by a relatively inexpensive sodium chloride rather than a more difficult to handle and expensive sodium hydroxide.

Useful loose and tight anion membranes are low electrical resistance type membranes. Resistance depends on parameters such as composition and thickness. For equal thickness a tight membrane typically has a higher resistance than a loose membrane. Loose membranes usually absorb more water, typically greater than 40 percent water by weight than tight membranes which typically absorb less than 40 percent by weight of water.

Loose anion membranes usually have a strong base associated with them to permit the anions to be easily attracted and moved through the membrane. Such membranes, for example, have positive charges supplied by quarternary amines. Resistances in 0.5 molar sodium chloride solution at 25° C. are typically less than 8 ohm centimeters square and preferably in the range of from 2 to 4 ohm centimeters square. Typical capacities of loose membranes are from 1 to 2 millieq/gram. Thicknesses of such membranes can vary and are typically from 0.05 to 2.0 millimeters and preferably, from 0.05 to 0.3 millimeters thick.

Tight membranes are usually weak base anion membranes. Examples of useful weak base anion membranes are Asahi's ASR, AAV and ACM (also made by Tokuyama Soda). Such bases can be tertiary amines and the resistance in 0.5 molar hydrochloric acid 25° C. is typically between 3 and 8 ohm centimeters square. Such membranes typically have thicknesses of from 0.1 to 0.2 millimeters and preferably, between 0.11 and 0.14 millimeters.

The sodium chloride salt feed can be at concentrations up to saturation, preferably, from 0.1 molar to saturation concentration, and are typically 0.5 molar or more. The citric acid feed stream can contain from 3 to 5, preferably 5 to 25 and more preferably 10 to 25 weight percent citric acid. The sodium citrate product stream will be at concentrations corresponding to the NaCl and citric acid feed streams. Preferably, the concentration of sodium citrate in the product is from 10 to 50, preferably 20 to 50, and more preferably 35 to 50 weight percent. The concentration of the hydrochloric acid in the acid compartment (A) product stream is from 2 to 25, preferably 2 to 15, and more preferably 5 to 15 weight percent.

As illustrated in FIG. 1, the acid product from compartment (A) is removed via line 15, the depleted citric acid feed stream is removed from base compartment (B) removed via line 18, and the sodium citrate salt solution from salt compartment (S) is removed via line 20. The electrodialytic water splitter can be operated in a batch mode, a continuous mode, or variations thereof. Product solutions or portions thereof may be recycled for further concentration.

Useful operating temperatures of from 0° C. to 100° C. are possible if the stability of the membranes and the solubility of the solution constituents permit. Generally, membrane life is longer at lower temperatures and power consumption will be lower at higher temperatures. Preferred operating temperatures are between 25° and 60° C., and more preferably, from 35° to 50° C.

The current passed through the water splitter is direct current of a voltage dictated by design and performance characteristics readily apparent to the skilled artisan and/or determined by routine experimentation. Current densities between 25 and 300 amps per square foot (between 28 and 330 milliamps per square centimeter) are preferred; and current densities between 50 and 150 amps per square foot (between 55 and 165 milliamps per square centimeter) are more preferred. Higher or lower current densities can be used for certain specific applications.

The present invention includes an improved method and related apparatus to electrodialytically make and convert citric acid to sodium citrate with improved purity and higher concentration.

The present invention includes an improved method to produce more concentrated sodium citrate of the type wherein carbohydrates are fermented to produce an aqueous solution containing citric acid. The improvement comprises electrodialytically converting the aqueous citric acid solution to sodium citrate solution. The electrodialytic process uses the apparatus and method as recited above. In addition to forming sodium citrate the citric acid broth is simultaneously converted to a purified sodium citrate in the electrodialysis unit. Unwanted cations are removed with the depleted stream 18 from the base compartment (B) and the chloride anions and other undesirable anions are removed with the acid stream 15 which is predominantly hydrochloric acid.

The method of producing sodium citrate by fermenting carbohydrates is well known as indicated in the Background of the Invention and described in Kirk-Othmer, supra, as well as Fong, Fermentation Processes, Report No. 95, Stanford Research Institute, pages 35-87 (April, 1975). Briefly, it is well known to produce citric acid by submerged-culture fermentation. Citric acid is produced by the aerobic fermentation of molasses with ASPERGILLUS NIGER or other yeast, mold or bacteria. Citric acid is an intermediate metabolic product of oxidative dissimulation of sugar and is produced through the formation of pyruvic acid. The proposed mechanism for the production of citric acid is known as the Krebs cycle. The Krebs cycle is broken at a point where citric acid is formed and destruction of citric acid must be minimized or stopped. This is done by properly regulating the pH and adding the specific enzyme inhibitors to the medium of both. Furthermore, the destruction can be stopped if the concentration of metallic co-factors is limited by using complexing or precipitating agents such as ferrocyanide or other decationizing medium. When using ASPERGILLUS NIGER, the conversion of glucose to citric acid is illustrated at Fong, page 41, supra. Reference is made to fermenter 50 in FIG. 2 which represents a typical fermenting means known in the art.

Citric acid can be produced by fermentation using the surface as well as to submerged culture processes. In either process, the fermentation is carried out in dilute, aqueous carbohydrate solutions containing the necessary nutrients and additives with a strain of ASPERGILLUS NIGER at about 77°-90° F. (25°-32° C.) under aeration. Presently, industry prefers the use of submerged culture processes. Other processes which are not as widely commercially used include semi-solid methods which involve the steps of sugar solution impregnated with sugar cane or beet pulp, sponge, or other solid carriers. The mass is sterilized in an inoculator to initiate the fermentation. The product is recovered from the carrier by washing, compression or other means. In another method, hydrocarbons (mainly N-paraffins) were mentioned as possible carbon sources for commercial citric acid fermentation. The fermentation step is therefore well known and widely used. It results in an aqueous "broth" which contains in solution citric acid as well as a variety of residual acids, enzymes, carbohydrates and microorganism by-products and products. The broth is typically at the temperature of the fermentation process which, as indicated, is from about 25° to 35° C.

The carbohydrates used in commercial citric acid fermentation include the technically purified cane or beet sugars including the various molasses. Other carbohydrates can include beet molasses, dextrose, which is hydrolized from corn starch, as well as high test molasses. Also useful are glucose or refined sucrose, as well as the less expensive black strap molasses, which usually requires purification for good citric acid yield. It is reported that high metallic ion concentrations and high total ash content in the carbohydrate generally decreases citric acid yield. One of the common chemicals used to treat commercial cane or beet molasses is therocyanide, such as potassium therocyanide.

Although high metallic ion concentrations in the molasses may be detrimental to citric acid yield, certain amounts of inorganic salts containing magnesium, nitrogen, phosphorous, potassium and sulfur, as well as traces of iron and magnesium and zinc are essential for the fermentation. The medium composition reported to give excellent microorganism growth may not give the best yield of metabolic products, and materials used up in the growing process will not be available in the metabolic process. The correct medium recipe promotes a sub-normal growth of the microorganism, leading to the formation of mycelium mats with no or very slight sporulation which favors metabolic product formation. A salt concentration which is too high can cause mycelia growth and sporulation and possibly also cause oxalic acid formation, both of which decreases citric acid yield. A salt concentration that is too low can deprive the necessary nutrients needed for the microorganism to grow and metabolize. Because data are obtained under different operating conditions with various microorganisms, discrepancies have been reported on the effects of various metallic ions and salts. One optimal set of ion concentrations for synthetic medium used in the shake flash reported by Fong contained less than one gram per liter of potassium dihydrogen phosphate; less than 2.5 grams per liter of magnesium sulfite, heptahydrates; about 1 milligram per liter of iron and about 2.5 grams per liter of ammonium nitrate. Additionally, adding a small amount of methanol or ethanol to the fermentation medium increases the citric acid yield and submerged culture formation using a variety of hydrocarbons. Nitrogen sources typically required for the fermentation is generally added in the medium in the form of ammonium salts (e.g., nitrate), aqueous ammonia or urea. The carbohydrate is diluted with water to form a fermentation media containing about 10 to 25 weight percent of sugar. The higher concentrations are believed to help inhibit the formation of acids other than citric acid in submerged culture fermentation. Therefore, the broth can contain any of a variety of anions and cations. The process of the present invention results in a sodium citrate stream substantially free of these anions and cations.

The optimal temperature and pH depend largely on the strain of microorganisms that is used. With ASPERGILLUS NIGER, the temperature of the citric acid formation generally ranges from 25°-32° C. and the fermentation is typically kept at a relatively low pH. In submerged culture fermentation, for example, the pH should not be allowed to rise above 3.5 after three days of fermentation. Inorganic acids such as hydrochloric acid and sulfuric acid can be used to control the pH and calcium carbonate is often used as a pH buffer. In surface culture fermentation the most effective pH was about from 5 to 7.

Fermentation of citric acid by surface culture process is carried out in shallow aluminum or stainless pans or trays that are stacked together with a few inches of space between them and placed in a culturing chamber that is equipped with sterilization, air circulation and temperature and relative humidity control devices. The medium containing 10 to 20 weight percent sugar is sterilized after the pH is adjusted and then cooled. Each tray is filled to about 1.5 to 3 inches deep (38-76 millimeters), typically, by flowing the medium gravitationally down from the tops of the tray to below through overflow tubes. A typical tray is about 7 feet by 7 feet (2 meters by 2 meters) containing about 50 to 100 gallons (190-378 liters) of medium. The medium is inoculated with a strain of ASPERGILLUS NIGER and kept at from 28°-32° C. and a relative humidity of 44 to about 66%.

Figure 2:
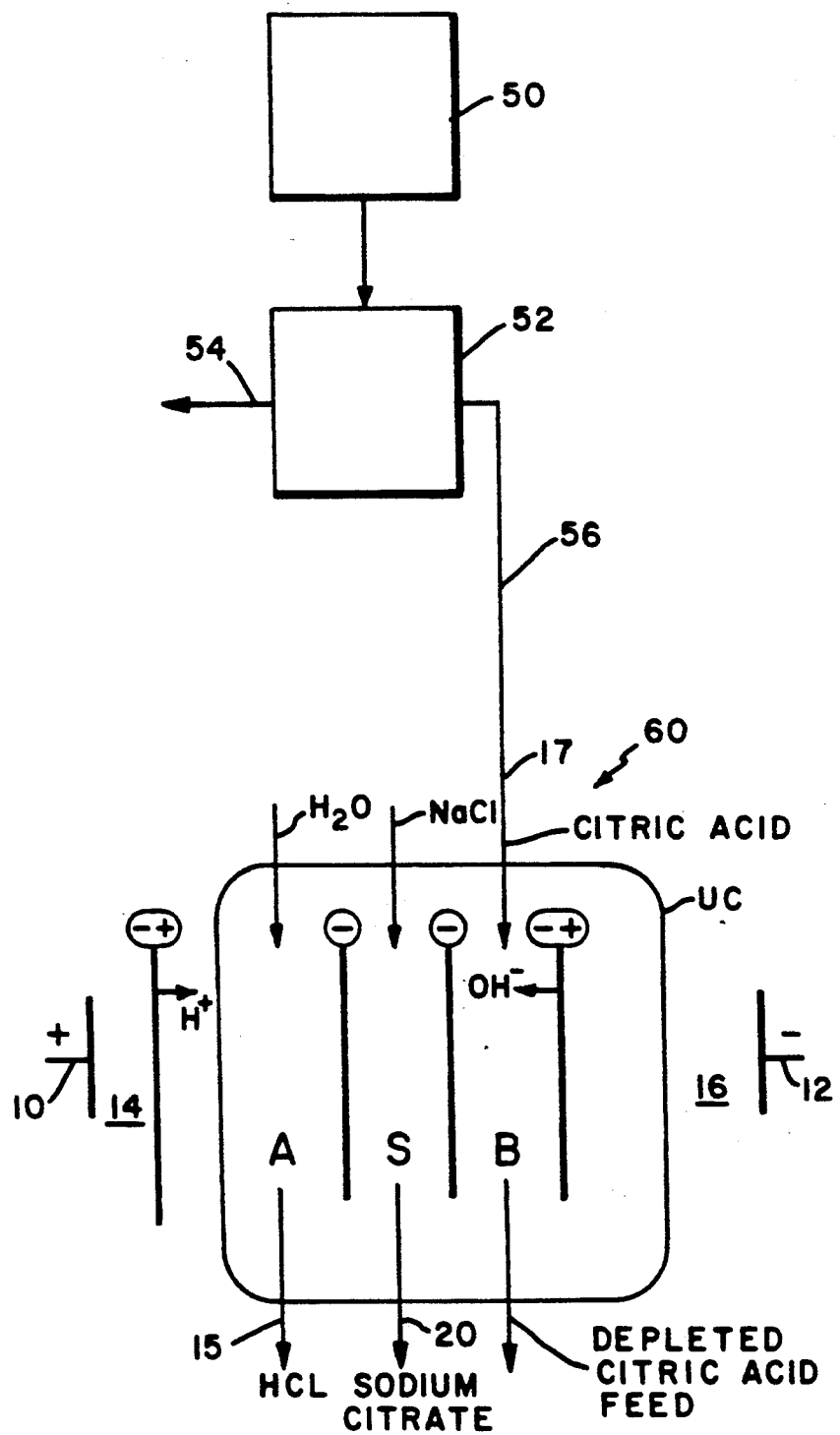
FIG. 2 is a flow diagram illustrating a preferred process of the present invention to produce sodium citrate.

Using any of the above processes, results in an aqueous broth containing a hodgepodge of anions, cations, residual microbes, residual carbohydrates and sugars, and various impurities. Referring to FIG. 2 the composition is typically at about 25° C. (ranging from 15° to 45° C.). The composition is fed from fermentator 50 to a separation means, such as a filtration device or settling tank 52. The mycelium is separated from the crude acids solution and in the separating means 52 and removed via line 54. The crude citric acid aqueous solution is removed from the separating means 52 via line 56. The crude citric acid solution contains a variety of salts in the form of anions and cations in the aqueous solution included thereon is also the raw citric acid. The citric acid stream 56 is fed via line 17 to the electrodialytic water splitter 60. The raw citric acid stream 17 is fed to the base compartment (B) in the water splitter. As recited above, sodium chloride is fed to the salt compartment (S) and an aqueous stream, optionally containing an acid, is fed to the acid compartment (A). A sufficient electrical potential is applied across the cells to cause the introduction of hydroxyl ions into the base compartment (B) and hydrogen ions into the acid compartment (A) from the means for splitting water, preferably a bipolar membrane. Citrate anions first anion membrane $11a'$ to the salt compartment (S). The citrate ions are stopped at the second anion membrane $11a$ which is nonselective to the citrate ions. However, the second membrane is selective to the chloride ions in the salt compartment (S) which permeate through the second anion membrane $11a'$ into the acid compartment (A) where they react with the hydrogen ions from the adjacent cation layer of the bipolar membrane $11b$ to form hydrochloric acid. A depleted aqueous citric acid stream is removed from the base compartment (B) at about pH7. A sodium citrate aqueous stream, which is the product, is removed via line 20 from the salt compartment (S) and hydrochloric acid in an aqueous stream 15 is removed from the acid compartment (A).

In addition to forming sodium citrate, the use of a first loose anion membrane $11a$ and a second tight anion membrane $11a'$ also results in the purification of the sodium citrate stream. The first anion membrane prevents the uncharged species such as sugars, mycelium, as well as cations in the raw citric acid stream (e.g., $Mg^{++}$, $Ca^{++}$) from leaving the base compartment (B). Such cations remain in the initial salt form and are withdrawn from the feed compartment. The hydroxyl ions from the adjacent anion layer of the adjacent bipolar membrane combine with remaining (H+) ions to form water. The first loose membrane permits all of the anions in the raw citric acid stream 17 to pass through into the salt compartment (S). Typically, such anions include sulfate, chloride, as well as citrate anions. The second tight anion membrane 11a' is not substantially selective to the citrate ion which remains in the salt compartment (S). However, it is selective to the mono and divalent chloride ion and sulfate ion even trivalent anions, such as phosphate. The weak acid citrate anion does not pass through the second anion membrane. This results in the acid compartment (A) product stream 15 containing the acids of these various anions. The acid is predominantly hydrochloric acid due to the salt feed to the salt stream.

While exemplary embodiments of the invention have been described, the true scope of the invention is to be determined from the following claims.

What is claimed is:

1. An electrodialysis apparatus comprising at least two unit cells, each unit cell comprising:
   at least one water splitter means to convert water to H+ and OH−;
   a first anion selective membrane adjacent to the water splitter means selective to anions having a negative valence of at least 1, there being a first base compartment between the anion selective membrane and water splitter means located to receive OH− from the water splitter means; and
   a second anion selective membrane adjacent to the first anion selective membrane, the second anion selective membrane selective to anions having a negative valence of less than the valence of anions to which the first anion membrane is selective, there being a salt compartment between the first and second anion selective membranes and an acid compartment on the opposite side of the second anion membrane from the salt compartment, the acid compartment adjacent to and disposed to receive H+ from a water splitting means serially aligned with the second anion membrane of the unit cell.

2. The apparatus as recited in claim 1 wherein the first anion selective membrane is selective to anions having a valence of from −1 to −3, and the second anion selective membrane is selective to anions having a valence of −1 to −2.

3. The apparatus as recited in claim 1 wherein the first anion selective membrane is selective to both weak and strong acid anions, and the second anion selective membrane is selective to strong acid anions.

4. An improved method to produce sodium citrate of the type wherein carbohydrates are fermented to produce an aqueous solution containing citric acid, wherein the improvement comprises:
   providing the electrodialysis apparatus of claim 1;
   feeding an aqueous salt solution comprising citric acid to the first base compartment;
   feeding an aqueous stream comprising sodium chloride to the salt compartment;
   feeding an aqueous stream optionally comprising acid to the acid compartment;
   applying a sufficient electrical potential across the cells to cause the introduction of (OH−) into the first base compartment and (H+) into the acid compartment from the means for splitting water, transport of citrate anioins from the first base compartment to the salt compartment, and the transport of chloride anions from the salt compartment to the acid compartment to convert the aqueous citric acid solution to sodium citrate solution.

5. The method of claim 4 wherein the aqueous citric acid solution is simultaneously converted to the sodium citrate and purified.

6. The method of claim 6 further comprising the steps of:
   removing a citric acid depleted aqueous stream from the base compartment;
   removing sodium citrate from the salt compartment; and
   removing hydrochloric acid from the acid compartment.

7. A method for generating salt comprising a donor cation and a salt anion from an aqueous acid solution, the acid comprising a donor anion using an electrodialytic apparatus comprising at least one unit cell comprising:
   at least one water splitter means to convert water to H+ and OH−;
   a first anion selective membrane adjacent to the water splitter means selective to donor anions and salt anions, there being a first base compartment between the first anion selective membrane and water splitter means located to receive OH− from the water splitter means; and
   a second anion selective membrane adjacent to the first anion selective membrane, the second anion selective membrane more selective to salt anions than to donor anions, there being a salt compartment between the first and second anion selective membranes and an acid compartment on the opposite side of the second anion membrane from the salt compartment, the acid compartment adjacent to and disposed to receive H+ from a water splitting means serially aligned with the second anion membrane of the unit cell, comprising the steps of:
   feeding an aqueous acid solution to the base compartment;
   feeding an aqueous salt stream to the salt compartment;
   feeding an aqueous stream optionally comprising acid to the acid compartment;
   applying a sufficient electrical potential across the cells to cause the introduction of (OH−) into the base compartment and (H+) into the acid compartment from the means for splitting water, transport of salt anions and donor anions from the base compartment to the salt compartment, and the transport of salt anions from the salt compartment to the acid compartment;
   removing an acid depleted aqueous stream from the base compartment;
   removing the salt of the acid anion and the donor cation from the salt compartment; and
   removing an acid of the salt anion from the acid compartment.

8. An electrodialysis apparatus comprising at least two unit cells, each unit cell comprising:
   at least one water splitter means to convert water to H+ and OH−;
   a first anion selective membrane, selective to citrate anions, adjacent to the water splitter means, there being a base compartment between the first anion selective membrane and water splitter means located to receive OH⁻ from the water splitter means; and a second anion selective membrane adjacent to the first anion selective membrane, the second anion selective membrane selective to chloride anions while substantially impermeable to transport of the citrate anions, there being a salt compartment between the first and second anion selective membranes and an acid compartment on the opposite side of the second anion membrane from the salt compartment, the acid compartment adjacent to and disposed to receive H⁺ from a water splitting means serially aligned with the second anion membrane of the unit cell.

9. The apparatus as recited in claim 8 further comprising a means to supply an electrical potential across said cell.

10. The apparatus as recited in claim 8 wherein the means for splitting water is a bipolar membrane.

11. A method for generating sodium citrate from an aqueous citric acid solution using an electrodialytic apparatus comprising at least one unit cell comprising:

at least one water splitter means to convert water to H⁺ and OH⁻;

a first anion selective membrane adjacent to the water splitter means selective to citrate anions, there being a first base compartment between the fist anion selective membrane and water splitter means located to receive OH⁻ from the water splitter means; and a second anion selective membrane adjacent to the first anion selective membrane, the second anion selective membrane selective to chloride anions and substantially impermeable to transport of citrate anions, there being a donor salt compartment between the first and second anion selective membranes and an acid compartment on the opposite side of the second anion membrane from the salt compartment, the acid compartment adjacent to and disposed to receive H⁺ from a water splitting means serially aligned with the second anion membrane of the unit cell, comprising the steps of:

feeding an aqueous solution comprising citric acid to the base compartment;

feeding an aqueous stream comprising sodium chloride to the salt compartment;

feeding an aqueous stream optionally comprising acid to the acid compartment;

applying a sufficient electrical potential across the cells to cause the introduction of (OH⁻) into the base compartment and (H⁺) into the acid compartment from the means for splitting water, transport of chloride and citrate anions from the base compartment to the salt compartment, and the transport of chloride anions from the salt compartment to the acid compartment;

removing a citric acid depleted aqueous stream from the base compartment;

removing sodium citrate from the salt compartment; and removing hydrochloric acid from the acid compartment.

12. An electrodialysis apparatus comprising at least two unit cells, each unit cell comprising:

at least one water splitter means to convert water to H⁺ and OH⁻;

a first anion selective membrane adjacent to the water splitter means selective to a first anion, there being a base compartment between the first anion selective membrane and water splitter means located to receive OH⁻ from the water splitter means; and a second anion selective membrane adjacent to the first anion selective membrane, the second anion selective membrane selective to a second anion, which is different than the first anion, and substantially nonselective to the first anion, there being a salt compartment between the first and second anion selective membranes and an acid compartment on the opposite side of the second anion membrane from the salt compartment, the acid compartment adjacent to and disposed to receive H⁺ from a water splitting means serially aligned with the second anion membrane of the unit cell.

13. The apparatus as recited in claim 5 further comprising a means to supply an electrical potential across said cell.

14. The apparatus as recited in claim 5 wherein the means for splitting water is a bipolar membrane.

* * * * *